US012784128B2

(12) United States Patent
Singh et al.

(10) Patent No.: US 12,784,128 B2
(45) Date of Patent: Nov. 3, 2026

(54) GPU MEMORY POOL MANAGER FOR VIRTUAL SHARED GPU MEMORY POOLING

(71) Applicant: Dell Products L.P., Round Rock, TX (US)

(72) Inventors: Ankit Singh, Bangalore (IN); Shrikant U. Hallur, Bangalore (IN); Naveen Awasthy, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 116 days.

(21) Appl. No.: 18/642,821

(22) Filed: Apr. 23, 2024

(65) Prior Publication Data

US 2025/0328984 A1 Oct. 23, 2025

(51) Int. Cl.
*G06T 1/60* (2006.01)

(52) U.S. Cl.
CPC .................................... *G06T 1/60* (2013.01)

(58) Field of Classification Search
None
See application file for complete search history.

(56) References Cited

U.S. PATENT DOCUMENTS

2015/0067672 A1* 3/2015 Mitra .................... G06F 9/5077 718/1
2018/0089881 A1* 3/2018 Johnson .............. G06F 9/45558
2018/0198618 A1* 7/2018 Park ........................ H04L 63/06
2018/0246911 A1* 8/2018 Lee ......................... G06F 16/21
2022/0137967 A1* 5/2022 Koker ................... G06F 9/3887
2025/0285206 A1* 9/2025 Wu .......................... G06T 1/60

OTHER PUBLICATIONS

Yeh, Ting-An, Hung-Hsin Chen, and Jerry Chou. "KubeShare: A framework to manage GPUs as first-class and shared resources in container cloud." Proceedings of the 29th international symposium on high-performance parallel and distributed computing. 2020. (Year: 2020).*

Park, Younghun, Minwoo Gu, and Sungyong Park. "Ballooning graphics memory space in full GPU virtualization environments." Scientific Programming 2019.1 (2019): 5240956. (Year: 2019).*

* cited by examiner

*Primary Examiner* — Zhengxi Liu
(74) *Attorney, Agent, or Firm* — Jackson Walker L.L.P.

(57) ABSTRACT

Disclosed methods provide a virtualized shared graphics processing unit (GPU) memory pool (VSGMP) to virtual machines running on an information handling system. The VSGMP may be implemented with a GPU memory pool (GMP) manager, featuring logic for abstracting the GPU memory pool from the physical memory resources of two or more GPUs. The GMP manager logic may be supported by a lightweight secure operating system (LSOS) capable of enabling functionality for virtualization and other use cases. Disclosed methods manage GPUs in an information handling system featuring two or more GPUs running virtual machines (VMs). When a GPU is assigned to a VM, disclosed methods perform one or more GPU resource allocation operations that support virtual shared pooling of the physical memory resources of two or more GPUs. In at least some embodiments, the GPU allocation operations include allocating at least some non-memory resources of the GPU exclusively to the applicable VM.

20 Claims, 3 Drawing Sheets

GPU MEMORY POOL MANAGER FOR VIRTUAL SHARED GPU MEMORY POOLING

TECHNICAL FIELD

The present disclosure pertains to memory management and, more particularly, management of a graphic processing unit (GPU) memory in a virtualized environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A GPU is a specialized processor for efficiently performing highly specific groups of mathematical calculations in parallel on large data sets. Initially designed for image processing, gaming, and other graphics applications, GPUs are now widely used for other computationally intensive workloads including cryptocurrency and artificial intelligence (AI).

GPUs have become increasingly pervasive over the last two decades. Many newer information handling systems, including many cotemporary desktop, laptop, and other client-class systems, employ multiple GPU cards. For example, many laptop systems that are sold or otherwise distributed with a single GPU card can be upgraded or expanded to include a second GPU card and many end users of such systems have added a second GPU card to improve performance.

GPUs may be found in virtualized computing platforms, in which a single system may support multiple virtual machines (VMs) and each VM may include its own instance of an operating system (OS). A GPU deployed in a virtualized environment is typically assigned to a VM when the VM is launched. In systems featuring multiple GPUs, there is often a 1:1 correspondence between VMs and GPUs. Subsequently, the memory resources of a first GPU may be entirely or substantially allocated due to a large workload while the memory resources of one or more other GPUs may be largely free due to a smaller workload. Unequal resource utilization across two or more GPUs may be referred to as a GPU occupancy issue and, within this disclosure, unequal utilization of GPU memory and any resulting disparities in VM performance may be referred to as a GPU memory occupancy issue.

SUMMARY

GPU memory occupancy issues discussed above are addressed by disclosed methods and systems able to provide a virtualized shared pool of GPU memory to VMs running on an information handling system. In at least some embodiments, the GPU memory pool is implemented with a GPU memory pool manager, referred to herein more concisely as GMP manager, featuring logic for abstracting the GPU memory pool from the physical memory resources of two or more GPUs. The GMP manager logic may be supported by a lightweight secure operating system (LSOS) capable of enabling functionality for virtualization and other use cases.

In one disclosed aspect, systems and methods manage GPUs in an information handling system featuring two or more GPUs running VMs. When a GPU is assigned to a VM, disclosed methods perform one or more GPU resource allocation operations that support virtual shared pooling of the physical memory resources of two or more GPUs. In at least some embodiments, the GPU allocation operations include allocating at least some non-memory resources of the GPU exclusively to the assigned VM while allocating the GPU's memory to a GMP manager communicatively coupled to each of the two or more GPUS.

In at least some embodiments, the GMP manager exposes a virtual shared pool of GPU memory that is abstracted from the physical memory of two or more GPUs and uniformly accessible to each VM. The GMP manager detects GPU memory read/write transactions from a VM and executes the transactions in the virtual shared GPU memory pool (VSGMP). The GMP manager may also maintain memory pool information, including information indicative of an amount of GPU memory contributed to the VSGMP by each of the VMs, and mapping information, indicative of portions of the VSGMP allocated to each VM. In at least one embodiment, the GMP manager is implemented as custom functionality enabled by a lightweight secure operating system (LSOS) underlying a hypervisor that deploys and manages the VMS.

In at least some embodiments, the GMP manager is configured to grant or deny GPU memory requests based on the amount of unallocated memory within the VSGMP and the amount of memory requested by the VM and, in at least some instances, without regard to the identity of the VM or the amount of GPU memory contributed to the VSGMP by the corresponding GPU.

The GMP manager may allocate "local" portions of the VSGMP preferentially wherein portions of the VSGMP comprising physical memory contributed by a GPU are allocated to the corresponding VM before allocating VSGMP portions contributed by another GPU.

The GMP manager may be configured to deny GPU memory requests when the requested allocation, if granted, would reduce the amount of unallocated memory below a threshold minimum unallocated memory. In addition, the GMP manager may deny requests for allocations exceeding a predetermined maximum allocation.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
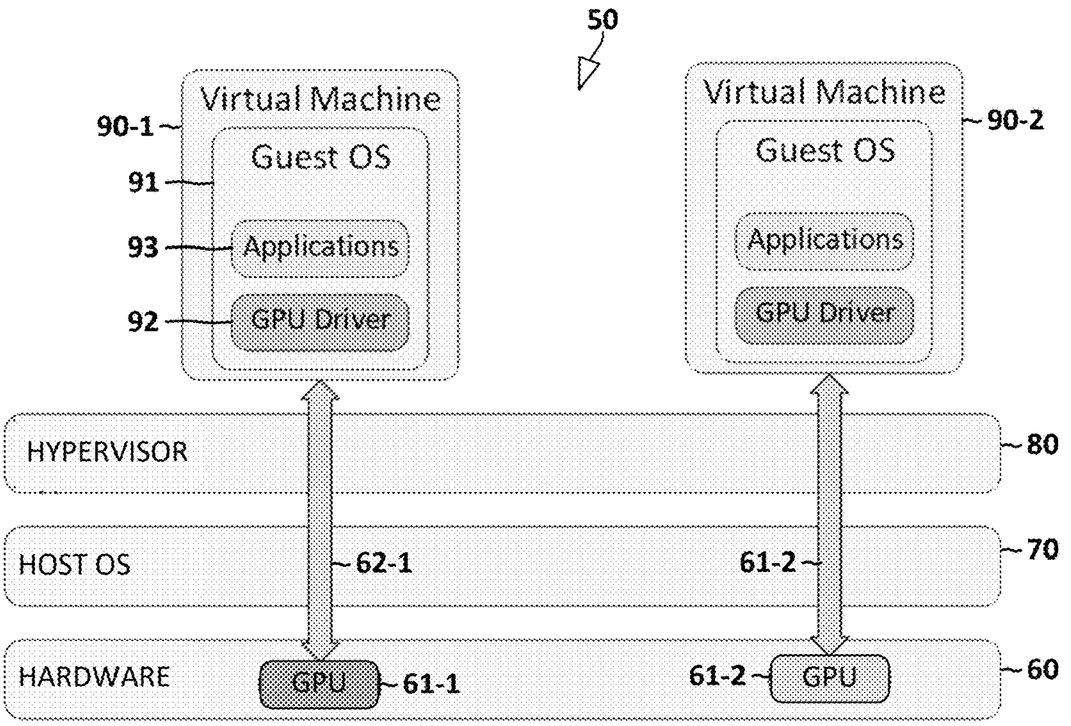
FIG. 1 illustrates GPU memory occupancy in a multi-GPU information handling system.

Exemplary embodiments and their advantages are best understood by reference to FIGS. 1-5, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Turning to FIG. 1, before describing disclosed methods and systems for implementing shared GPU memory pools, an information handling system susceptible to GPU memory occupancy is illustrated. As depicted in FIG. 1, information handling system 50 includes hardware 60 featuring two GPUs 61-1 and 61-2, a host operating system (OS) 70, and a hypervisor 80 running two VMs 90-1 and 90-2. Each VM 90 depicted in FIG. 1 includes a guest OS 91, a GPU driver 92, and one or more applications 93.

FIG. 1 depicts a configuration in which each GPU 61 has been assigned to a corresponding VM 90 such that there is a 1:1 correspondence between VMs 90 and GPUs 61. Each GPU 61 is provisioned with various resources (not explicitly depicted in FIG. 1) including, as non-exhaustive examples, compute resources, memory resources, I/O resources, networking resources, thermal and power management resources, etc. In at least one embodiment of the depicted configuration, each GPU-to-VM assignment 62 is an undivided assignment that allocates all resources of the GPU 61 to the corresponding VM 90.

In the undivided assignment configuration depicted in FIG. 1, resources of first GPU 61-1 are unavailable to second VM 90-2 and resources of second GPU 61-2 are unavailable to first VM 90-1. In general, VM workloads vary as a function of time and, in at least some deployments, the workloads for VMs 90-1 and 90-2 may exhibit at least some degree of mutual independence. In any such environment, GPU memory occupancy may occur, for example, when first VM 90-1 is operating in a memory-constrained state, in which additional GPU memory, if available to first VM 90-1, could improve one or more performance parameters of one or more applications 93 executing in first VM 90-1, at a time when second VM 90-2 is operating in a resource-plentiful state, in which a reduction in GPU memory available to second VM 90-2 would not have a significant negative performance on second VM 90-2.

Figure 2:
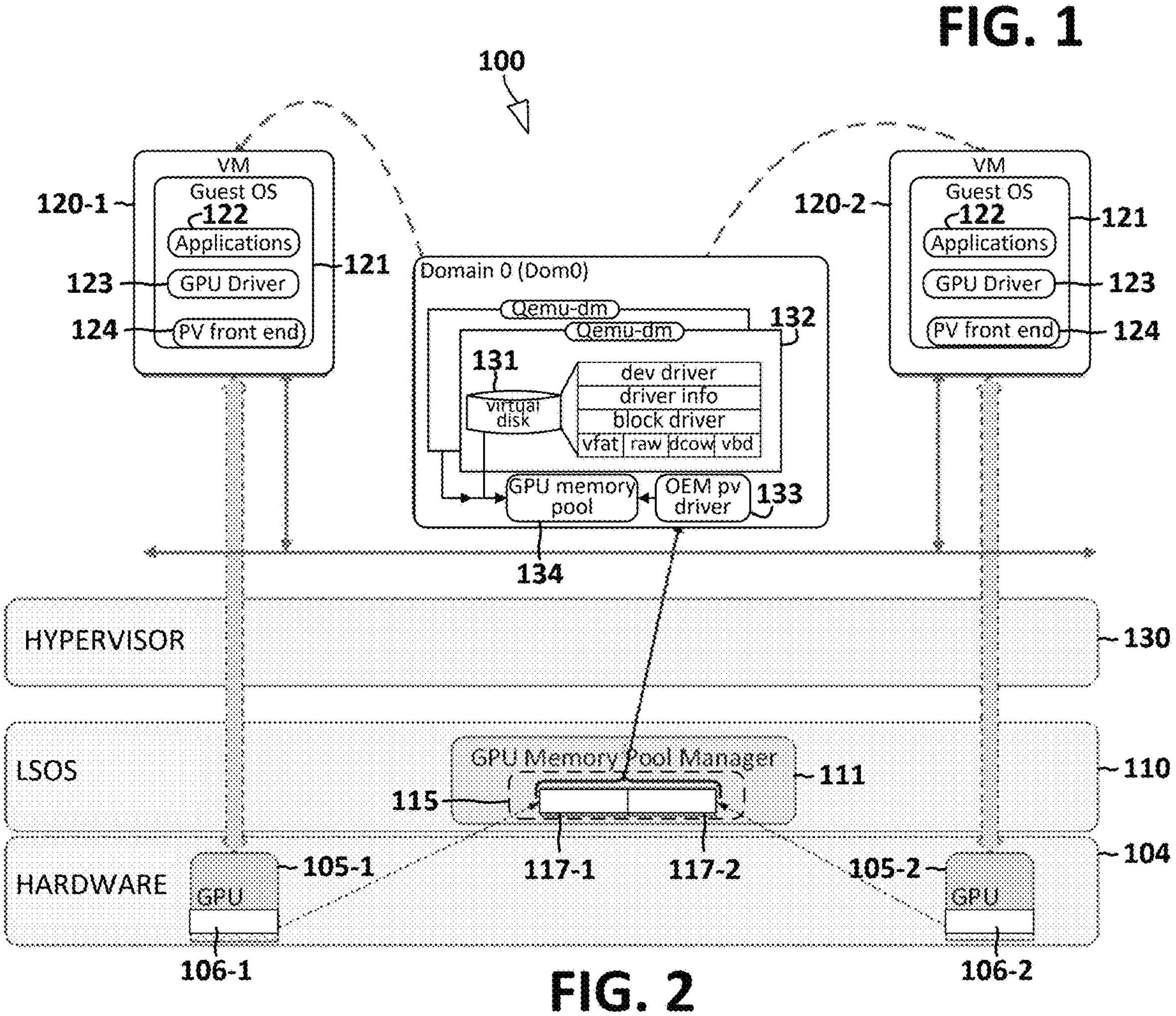
FIG. 2 illustrates an LSOS framework suitable for implementing a disclosed GMP manager.

FIG. 2 illustrates an information handling system 100 in accordance with disclosed features enabling pooled GPU memory for use in virtualized environments. As depicted in FIG. 2, information handling system 100 is a multi-GPU system with hardware 104 featuring multiple GPUs 105 including the first GPU 105-1 and the second GPU 105-2 depicted in FIG. 2. The depicted information handling system 100 includes, enables, and/or supports a hypervisor 130, configured to deploy and manage one or more VMs 120, and an LSOS 110. Each VM 120 depicted in FIG. 2 includes a guest OS 121, a GPU driver 123, one or more applications 122, and a paravirtualization (PV) front end driver 124 for embodiments featuring a Xen-based hypervisor.

Figure 3:
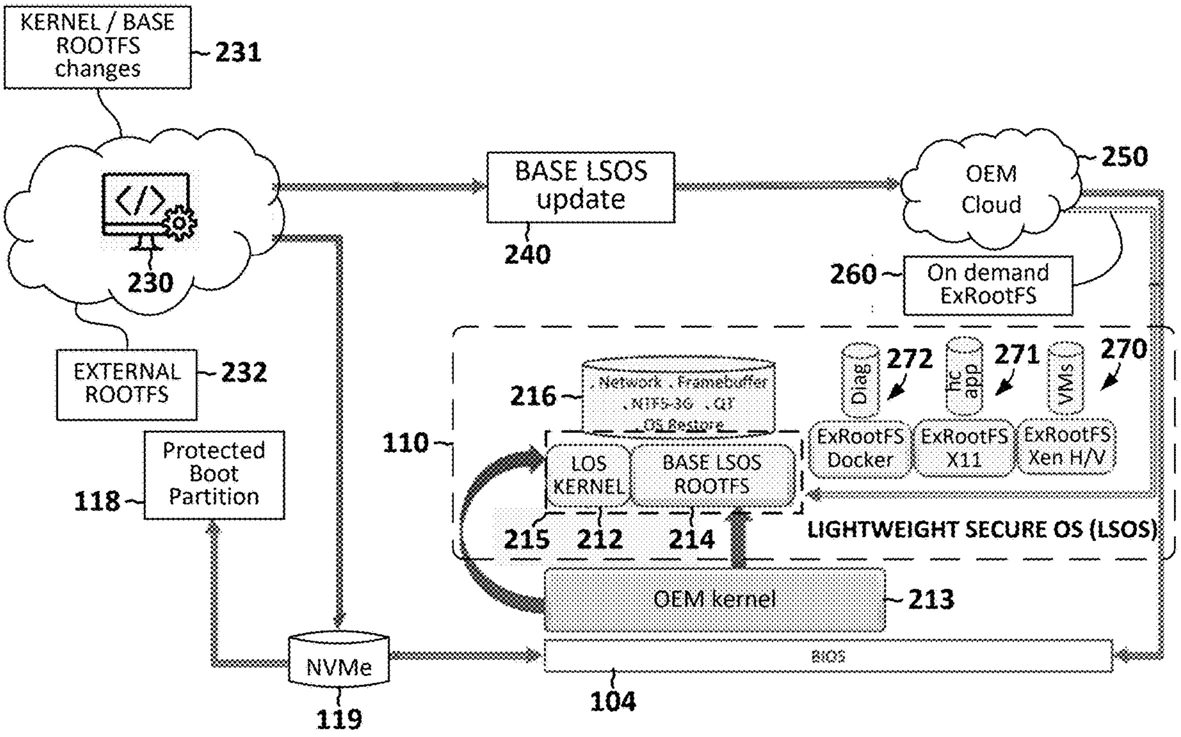
FIG. 3 illustrates an exemplary implementation of a VSGMP.

LSOS 110 enables custom functionality suitable for use in various use cases including, but not limited to, the virtual machine use case depicted in FIG. 2. Additional details of LSOS 110 are illustrated in FIG. 3 below and described in the accompanying text.

LSOS 110 is depicted in FIG. 2 enabling a GPU memory pool manager 111, referred to herein more succinctly as GMP manager 111, configured to emulate, abstract, expose, or otherwise provide a VSGMP 115 accessible to each VM 120. The illustrated VSGMP 115 encompasses the GPU memories 106 of each GPU 105 and includes a first segment 117-1 corresponding to the GPU memory 106-1 contributed to VSGMP 115 by first GPU 105-1 and a second segment 117-2 corresponding to the GPU memory 106-2 of second GPU 105-2.

In at least some embodiments, GMP manager 111 is configured to detect GPU memory transactions from VMs 120 and to execute, complete, or otherwise perform GPU memory transactions via VSGMP 115. GPU memory transactions may include GPU read/write transactions and GPU allocation and/or configuration transactions.

GMP manager 111 may keep track of memory assignments and ensure that no VM 120 exhausts GPU memory. In at least some embodiments, GMP manager 111 may maintain a tracking table to record and monitor GPU memory pool allocations. e.g., 1 GB of GPU memory pool 115 has been allocated to first VM 120-1 and 3 GB of GPU memory pool 115 has been allocated to second VM 120-2.

In some embodiments, GMP manager 111 may preferentially allocate GPU memory that is local to a requesting VM. For example, if first VM 120-1 requests an allocation of 2 GB and when there is 1 GB of unallocated memory in the GPU memory of first GPU 105-1 and 3 GB of unallocated memory in the GPU memory of second GPU 105-2, GMP manager 111 may allocate the remaining 1 GB of unallocated memory in first GPU 105-1 before allocating the remaining 1 GB of the requested allocation from second GPU 105-2.

After any VM 120 has exhausted its initial allocation of GPU memory, VM 120 may request and receive additional extra memory from the GPU memory pool 115, if available, subject to an optional and pre-defined maximum limit.

The LSOS 110 depicted in FIG. 2 may serve as a foundational enabling technology for multiple use cases, independent of the host OS, enabling original equipment manufacturer (OEM) teams and customers to build innovative solutions on top of the LSOS. Enabled and optimized for pre-boot environments, at least some embodiments of LSOS 110 are compact, e.g., less than 100 MB, and may reside on an OEM-protected Non-Volatile Memory Express (NVMe) partition. Embodiments may support OEM-specific hypervisor calls for platform and peripheral management and an OEM cloud control plane for deployment, configuration, and service. Silicon and OS agnostic, LSOS 110 may support ARM, x86, and other silicon architectures.

Hypervisor 130 may be implemented as a Xen hypervisor enabling a device emulator 132 running in a Xen Domain 0 to emulate a virtual disk 131 providing a data structure for a GPU memory pool 134. Each VM 120 may be enabled to access GPU memory pool 134 via a PV front end driver 124 and GMP manager 111 may communicate with GPU memory pool 134 through an OEM backend PV driver 133.

Turning now to FIG. 3, the LSOS 110 of FIG. 1 is illustrated in additional detail. The LSOS 110 depicted in FIG. 3 comprises a lightweight (<100 MB), secure operating system suitable for enabling a variety of functions or use cases, independent of the host OS and agnostic with respect to the underlying silicon. LSOS 110 may feature one or more OEM-specific features supporting, as examples, OEM-specific hypercalls for platform and peripheral management, an OEM cloud control plane for deployment, configuration, and service, and an independent channel for OEM offerings to connect OEM hardware with an OEM cloud.

The LSOS 110 depicted in FIG. 3 includes a base LSOS 215, including a kernel 212 and a base LSOS rootfs 214, retrieved from a protected boot partition 118 in NVMe 119 by BIOS 104, and one or more external rootfs instances available on-demand for enabling specific functionality. The base LSOS 215 in FIG. 3 may include at least some OEM-specific features of a custom OEM kernel 213. Base LSOS 215 may enable various utility applications 216 including, in the illustrated example, graphical display utilities such as Linux framebuffer, file system drivers such as NTFS-3g, etc.

The exemplary external rootfs instances depicted in FIG. 3 include an external rootfs 270 enabling a Xen hypervisor for providing VM functionality, an X11 rootfs 271 for a hybrid client application 271, and an external rootfs 272 enabling a diagnostic application. The illustrated external rootfs instances and other embodiments may include or support more, fewer, and/or different external rootfs examples.

As depicted in FIG. 3, a software development/management platform 230, e.g., Jenkins, delivers kernel and base rootfs changes/updates 231 as base LSOS updates 240 via an OEM cloud 250. The illustrated platform 230 also receives uploads of external rootfs instances 232 and delivers them as on-demand external rootfs 260 via OEM cloud 250.

Figure 4:
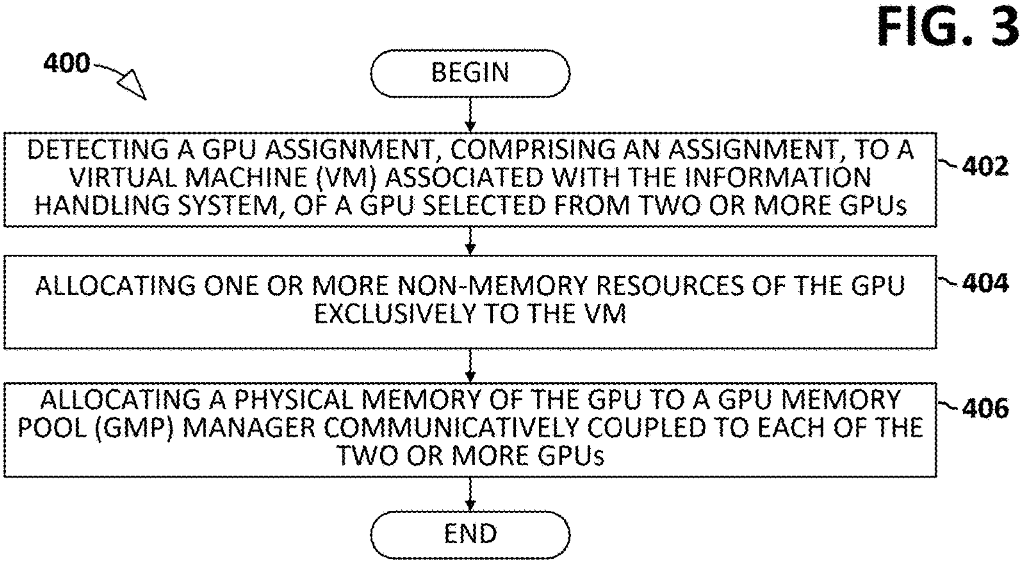
FIGS. 4 and 5 illustrate flow diagrams of methods for providing and managing a virtual shared pool of GPU memory in a multi-GPU information handling system.

Referring now to FIG. 4, a flow diagram illustrates a method 400 for managing GPU memory resources in a virtualized environment to enable a virtual shared GPU memory pool accessible to any VM running on the system. As depicted in FIG. 4, method 400 includes, detecting (step 402) a GPU assignment, comprising an assignment of a GPU selected from a group of two or more GPUs included in an information handling system, to a VM associated with the information handling system, performing GPU allocation operations. The allocation operations depicted in FIG. 4 include allocating (step 404) one or more non-memory resources of the GPU exclusively to the VM. Non-memory GPU resources may include, in at least one embodiment, GPU processing clusters, GPU I/O resources, GPU network interface resources, and so forth. The illustrated method 400 further includes allocating (step 406) a physical GPU memory of the GPU to a GPU memory pool (GMP) manager communicatively coupled to each of the two or more GPUS, wherein the GMP manager is configured to perform GPU memory transactions.

Figure 5:
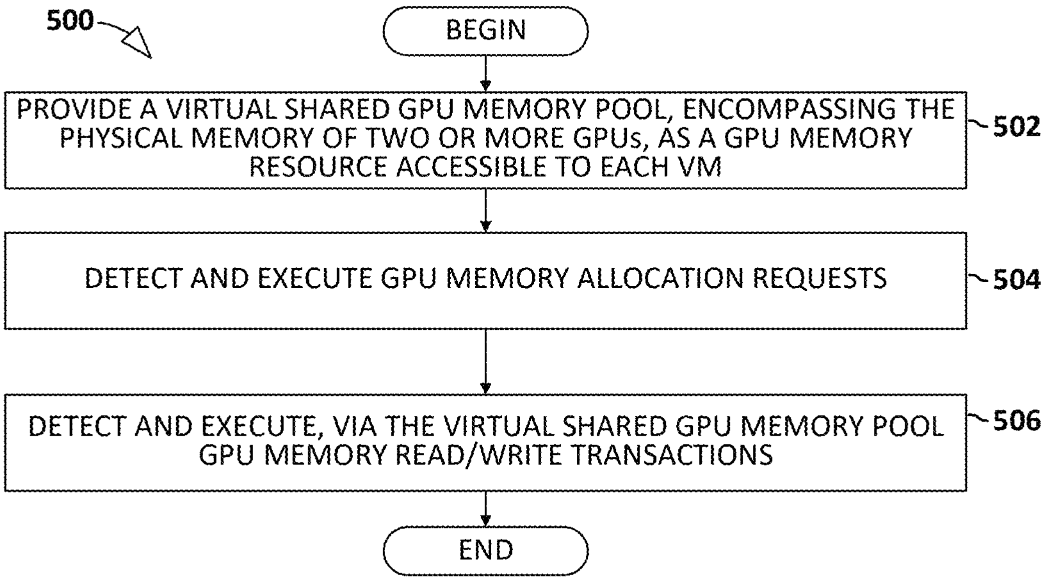

Referring now to FIG. 5 a flow diagram illustrates a GPU management method 500, which may be performed by the GMP manager 111 to provide, support, and maintain VSGMP 115. The illustrated method 500 of FIG. 5 includes providing (step 502) a virtual shared GPU memory pool, encompassing the physical memory of two or more GPUs, as a GPU memory resource accessible to each VM. The illustrated method 500 further includes detecting and executing (block 504) GPU memory allocation requests and GPU memory read/write requests 506).

Figure 6:
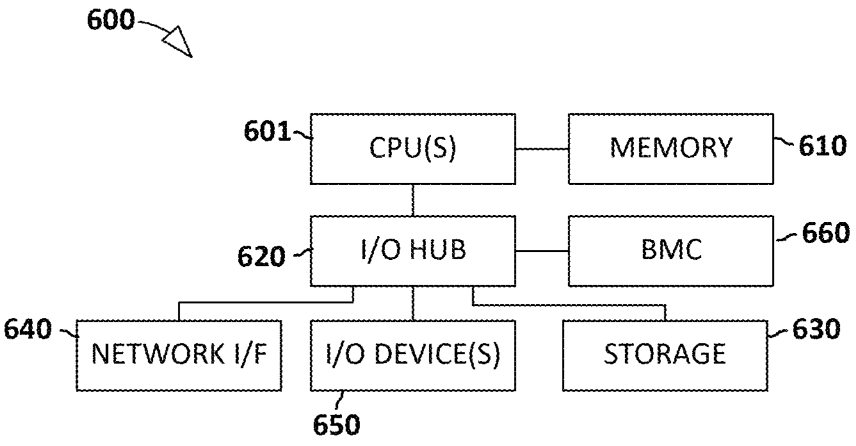
FIG. 6 illustrates an exemplary information handling system suitable for use in conjunction with shared GPU memory pool features disclosed herein.

Referring now to FIG. 6, any one or more of the elements illustrated in FIG. 1 through FIG. 3 may be implemented as or within an information handling system exemplified by the information handling system 600 illustrated in FIG. 6. The illustrated information handling system includes one or more general purpose processors or central processing units (CPUs) 601 communicatively coupled to a memory resource 610 and to an input/output hub 620 to which various I/O resources and/or components are communicatively coupled. The I/O resources explicitly depicted in FIG. 6 include a network interface 640, commonly referred to as a NIC (network interface card), storage resources 630, and additional I/O devices, components, or resources 650 including as non-limiting examples, keyboards, mice, displays, printers, speakers, microphones, etc. The illustrated information handling system 600 includes a baseboard management controller (BMC) 660 providing, among other features and services, an out-of-band management resource which may be coupled to a management server (not depicted). In at least some embodiments, BMC 660 may manage information handling system 600 even when information handling system 600 is powered off or powered to a standby state. BMC 660 may include a processor, memory, an out-of-band network interface separate from and physically isolated from an in-band network interface of information handling system 600, and/or other embedded information handling resources. In certain embodiments, BMC 660 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for managing graphics processing units (GPUs), the method comprising:

responsive to detecting a GPU assignment, comprising an assignment of a first GPU, selected from a group of two or more GPUs included in an information handling system, to a virtual machine (VM) associated with the information handling system, performing GPU allocation operations including:

allocating one or more non-memory resources of the first GPU exclusively to the VM; and allocating a physical memory of the first GPU to a GPU memory pool (GMP) manager communicatively coupled to each of the two or more GPUs, whereby the first GPU includes one or more non-memory resources dedicated exclusively to the first GPU and a shared physical memory resource;

wherein the GMP manager is configured to:

abstract a virtualized shared GPU memory pool (VSGMP), encompassing physical memories corresponding to each of the two or more GPUs, as a GPU memory resource accessible to VMs running in the information handling system; and execute GPU memory transactions from any of the VMs via the VSGMP.

2. The method of claim 1, wherein the GMP manager is configured to:

perform GPU memory allocations, allocating portions of the VSGMP to a particular VM, in response to at least some GPU memory transactions.

3. The method of claim 2, wherein the GMP manager is configured to:

maintain GMP information indicative of an amount of physical memory contributed to the VSGMP by each of the VMs.

4. The method of claim 2, wherein the GMP manager is configured to:

maintain mapping information indicative of portions of the VSGMP allocated to each of two or more VMs.

5. The method of claim 1, wherein the GMP manager is configured to grant or deny GPU memory requests from the VM based, at least in part, on:

an amount of unallocated memory within the VSGMP; and an amount of memory indicated in the GPU memory request.

6. The method of claim 5, wherein the GMP manager is denied GPU memory requests that, if granted, would reduce the amount of unallocated memory below a threshold minimum unallocated memory.

7. The method of claim 1, wherein the GMP manager is configured to grant or deny GPU memory requests from the VM without regard to an identity of the VM.

8. The method of claim 1, wherein the GMP manager is configured to grant or deny GPU memory requests from the VM without regard to the amount of physical memory contributed to the VSGMP by the VM.

9. The method of claim 1, wherein the GMP manager is configured to allocate portions of the VSGMP preferentially, and wherein unallocated portions of the VSGMP comprising physical memory contributed by the VM are allocated to the VM before allocating any unallocated portions contributed by another VM.

10. The method of claim 1, wherein the GMP manager runs within a hypervisor enabled by a lightweight secure operating system (LSOS).

11. An information handling system, comprising:
- a central processing unit (CPU);
- two or more graphics processing units (GPUs); and
- system memory, accessible to the CPU, and including processor-executable instructions that, when executed by the CPU, cause the system to perform GPU management operations including, responsive to detecting a GPU assignment, comprising an assignment of a first GPU, selected from a group of two or more GPUs included in the information handling system, to a virtual machine (VM) associated with the information handling system, performing GPU allocation operations including:
  - allocating one or more non-memory resources of the first GPU exclusively to the VM; and
  - allocating a physical memory of the first GPU to a GPU memory pool (GMP) manager communicatively coupled to each of the two or more GPUs, whereby the first GPU includes one or more non-memory resources dedicated exclusively to the first GPU and a shared physical memory resource;
  - wherein the GMP manager is configured to:
    - abstract a virtualized shared GPU memory pool (VSGMP), encompassing physical memories corresponding to each of the two or more GPUs, as a GPU memory resource accessible to VMs running in the information handling system; and
    - execute GPU memory transactions from any of the VMs via the VSGMP;
    - wherein the GPU resources include one or more non-memory resources dedicated exclusively to the GPU and a shared physical memory resource.

12. The information handling system of claim 11, wherein the GMP manager is configured to:
- perform GPU memory allocations, allocating portions of the VSGMP to a particular VM, in response to at least some GPU memory transactions.

13. The information handling system of claim 12, wherein the GMP manager is configured to:
- maintain GMP information indicative of an amount of physical memory contributed to the VSGMP by each of the VMs.

14. The information handling system of claim 12, wherein the GMP manager is configured to:
- maintain mapping information indicative of portions of the VSGMP allocated to each of two or more VMs.

15. The information handling system of claim 11, wherein the GMP manager is configured to grant or deny GPU memory requests from the VM based, at least in part, on:
- an amount of unallocated memory within the VSGMP; and
- an amount of memory indicated in the GPU memory request.

16. The information handling system of claim 15, wherein the GMP manager is denied GPU memory requests that, if granted, would reduce the amount of unallocated memory below a threshold minimum unallocated memory.

17. The information handling system of claim 11, wherein the GMP manager is configured to grant or deny GPU memory requests from the VM without regard to an identity of the VM.

18. The information handling system of claim 11, wherein the GMP manager is configured to grant or deny GPU memory requests from the VM without regard to the amount of physical memory contributed to the VSGMP by the VM.

19. The information handling system of claim 11, wherein the GMP manager is configured to allocate portions of the VSGMP preferentially, and wherein unallocated portions of the VSGMP comprising physical memory contributed by the VM are allocated to the VM before allocating any unallocated portions contributed by another VM.

20. The information handling system of claim 11, wherein the GMP manager runs within a hypervisor enabled by a lightweight secure operating system (LSOS).

* * * * *